(12) United States Patent
Cha et al.

(10) Patent No.: US 9,073,132 B2
(45) Date of Patent: Jul. 7, 2015

(54) PCD MILLING CUTTER FOR LENS PROCESSING

(71) Applicants: In-Sun Cha, Seoul (KR); Soo-Il Cha, Seoul (KR); Dong-Bin Jang, Incheon (KR)

(72) Inventors: In-Sun Cha, Seoul (KR); Soo-Il Cha, Seoul (KR); Dong-Bin Jang, Incheon (KR)

( * ) Notice: Subject to any disclaimer, the term of this patent is extended or adjusted under 35 U.S.C. 154(b) by 59 days.

(21) Appl. No.: 13/721,271

(22) Filed: Dec. 20, 2012

(65) Prior Publication Data

US 2014/0119843 A1    May 1, 2014

(30) Foreign Application Priority Data

Oct. 26, 2012  (KR) ...................... 10-2012-00119662

(51) Int. Cl.
  *B23C 5/14*  (2006.01)
  *B23C 5/10*  (2006.01)
  *B23C 5/18*  (2006.01)

(52) U.S. Cl.
  CPC .......... *B23C 5/1081* (2013.01); *Y10T 407/1946* (2015.01); *B23C 5/14* (2013.01); *B23C 5/18* (2013.01); *B23C 2226/315* (2013.01); *B23C 2240/08* (2013.01); *B23C 2210/084* (2013.01)

(58) Field of Classification Search
  CPC ........ B23C 5/14; B23C 5/10; B23C 220/203; B23C 2226/315; Y10T 409/30952
  USPC ...................... 407/62; 409/234, 50
  See application file for complete search history.

(56) References Cited

U.S. PATENT DOCUMENTS

| | | | | |
|---|---|---|---|---|
| 5,672,031 A * | 9/1997 | Oles | ................................ | 407/35 |
| 5,915,888 A * | 6/1999 | Minicozzi | ....................... | 407/54 |
| 6,123,487 A * | 9/2000 | Mina | .............................. | 407/42 |
| 6,652,201 B2 * | 11/2003 | Kunimori et al. | ............... | 407/35 |
| 6,913,424 B2 * | 7/2005 | Yoshihiro et al. | ............... | 407/42 |
| 8,011,863 B2 * | 9/2011 | Maurer | ......................... | 407/119 |
| 8,529,164 B2 * | 9/2013 | Degany | .......................... | 407/53 |
| 2008/0206007 A1 * | 8/2008 | Hughes | .......................... | 409/51 |
| 2010/0226729 A1 | 9/2010 | Schneider | | |
| 2013/0045059 A1 * | 2/2013 | Bozkurt | ....................... | 409/131 |

FOREIGN PATENT DOCUMENTS

| | | |
|---|---|---|
| JP | 229858 A | 9/2007 |
| KR | 10-2012-0097328 A | 9/2012 |
| WO | 9943460 A1 | 9/1999 |

OTHER PUBLICATIONS

Korean Notice of Allowance, dated Dec. 15, 2014, pp. 4.

\* cited by examiner

*Primary Examiner* — Will Fridie, Jr.
(74) *Attorney, Agent, or Firm* — Chapin IP Law, LLC

(57) ABSTRACT

Disclosed is a PCD milling cutter for lens processing. The PCD milling cutter includes a shaft having one axial end portion rotatably coupled with a driving unit of a milling unit for lens processing, a rotary head coupled with the axial end portion of the shaft and having a plurality of installation protrusions which protrude outward along a circumference thereof about a rotation center and have outer circumferential surfaces rounded in an axial direction of the shaft, and a plurality of PCD tips coupled with installation surfaces of the installation protrusions positioned in a rotation direction, provided at outer end portions thereof with rounded cutting blades sharply processed in the axial direction of the shaft, and provided in inner end portions thereof, which are opposite to the cutting blades, with cutting grooves formed in a concave shape to increase a welding force.

6 Claims, 6 Drawing Sheets

PCD MILLING CUTTER FOR LENS PROCESSING

CROSS-REFERENCE TO RELATED APPLICATION

This application claims priority to Korean Patent Application No. 10-2012-00119662 filed on Oct. 26, 2012 and all the benefits accruing therefrom under 35 U.S.C. §119, the contents of which are incorporated by reference in their entirety.

BACKGROUND OF THE INVENTION

1. Field of the Invention

The present invention relates to a cutter. More particular, the present invention relates to a PCD milling cutter for lens processing, in which the end portion opposite to a cutting blade of polycrystalline diamond (PCD) tips designed to have a combination representing superior abrasion resistance is cut in the concave shape, so that the installation surface of the PCD tip is formed with a narrow width, thereby reducing the material cost in the manufacturing process of the PCD tips.

2. Description of the Related Art

In general, when a lens including non-iron metal is manufactured through a process using a cutting tool, a milling tool, or a machining tool, the relation between the abrasion property and the productivity of the tool and the economic feasibility of the tool is very important. Recently, when a milling work is performed to manufacture a glasses-lens including high-hardness plastic, a cutter having a tip including PCD representing a superior abrasion property is employed in the milling tool.

The cutter includes a shaft to receive driving force, and a head coupled with a front end portion of the shaft, in which the PCD tip processed by using steel is welded with the outer peripheral portion of the head.

However, since the coupling portion of the cutter for lens processing occupies a wide area except for the cutting blade of the tip making contact with the portion of the lens to be processed, the manufacturing cost is increased, so that the economic feasibility is lowered.

Further, in cutters for lens processing according to the related art, since most tips have outer end portions provided in the form of a horizontal surface, the end portion opposite to the cutting blade may interfere with a workpiece.

Therefore, an advanced PCD cutter having high productibility, superior abrasion property and superior durability under the high-temperature environment is required. Such a tool must be easily manufactured and the manufacturing cost must be low.

A cited reference related to the present invention includes Korean Patent Registration No. 10-0177286 (issued on Nov. 17, 1998), and a milling cutter is disclosed in Korean Patent Registration No. 10-0177286 (issued on Nov. 17, 1998).

SUMMARY OF THE INVENTION

An object of the present invention is provide a PCD milling cutter for lens processing, in which the end portion opposite to a cutting blade of a polycrystalline diamond (PCD) tip is cut in the concave shape, so that the installation surface of the PCD tip has a narrow width, thereby reducing the material cost in the manufacturing process of the PCD tip.

In addition, another object of the present invention is to provide a PCD milling cutter for processing a lens, in which the cutting blade of a PCD tip making contact with a portion of a lens to be processed is inclined while protruding outward, so that the interference between the cutting blade of the PCD tip and the lens can be prevented, thereby improving the cutting performance.

Therefore, still another object of the present invention is provide a PCD milling cutter having an improved abrasion resistance in a cutting work and improved durability by using PCD tips obtained by varying the sizes of particles constituting the structures thereof and alternately arranging the PCD tips having different strengths, so that the PCD tips make contact with a workpiece with different strengths when a tool is rotated.

In order to accomplish the above objects, there is provided a PCD milling cutter for lens processing. The PCD milling cutter includes a shaft having one axial end portion rotatably coupled with a driving unit of a milling unit for lens processing, a rotary head coupled with the axial end portion of the shaft and having a plurality of installation protrusions which protrude outward along a circumference thereof about a rotation center and have outer circumferential surfaces rounded in an axial direction of the shaft, and a plurality of PCD tips coupled with installation surfaces of the installation protrusions positioned in a rotation direction, provided at outer end portions thereof with rounded cutting blades sharply processed in the axial direction of the shaft, and provided in inner end portions thereof, which are opposite to the cutting blades, with cutting grooves formed in a concave shape to increase a welding force.

In this case, each cutting blade may have an inclination angle such that an end portion of the rotary head positioned in the rotation direction protrudes outward, and have a semicircular shape.

In addition, preferably, each cutting groove has one of a curved U shape and an angled V shape.

Meanwhile, each PCD tip may include a cutting step formed by slantingly cutting an end portion directed in the axial direction based on the cutting groove.

Further, the PCD tips may be obtained by varying sizes of particles constituting fine structures and are arranged to have mutually different strengths so that the PCD milling cutter has improved abrasion resistance in a cutting work and improved durability.

In this case, the PCD tips may be repeatedly arranged such that the strengths of the PCD tips are gradually increased.

Therefore, according to the present invention, the end portion of the PCD tip 300 opposite to the cutting blade 310 is cut in the concave shape, so that the installation surface of the PCD tip 300 has a narrow width. Accordingly, the material cost can be saved when the PCD tip 300 is manufactured.

In addition, the cutting blade of a PCD tip making contact with a portion of a lens to be processed is inclined while protruding outward, so that the interference between the cutting blade of the PCD tip and the lens can be prevented, thereby improving the cutting performance.

DETAILED DESCRIPTION OF THE INVENTION

Figure 1:
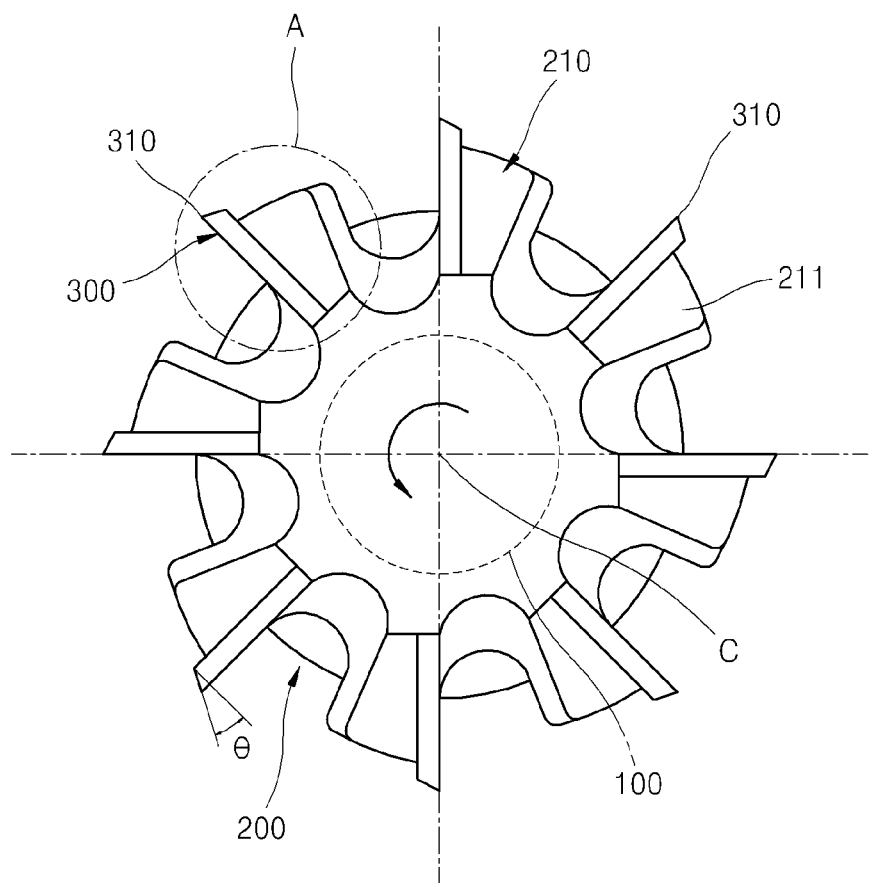
FIG. 1 is a front view showing a PCD milling cutter for lens processing according to the present invention.
Figure 2:
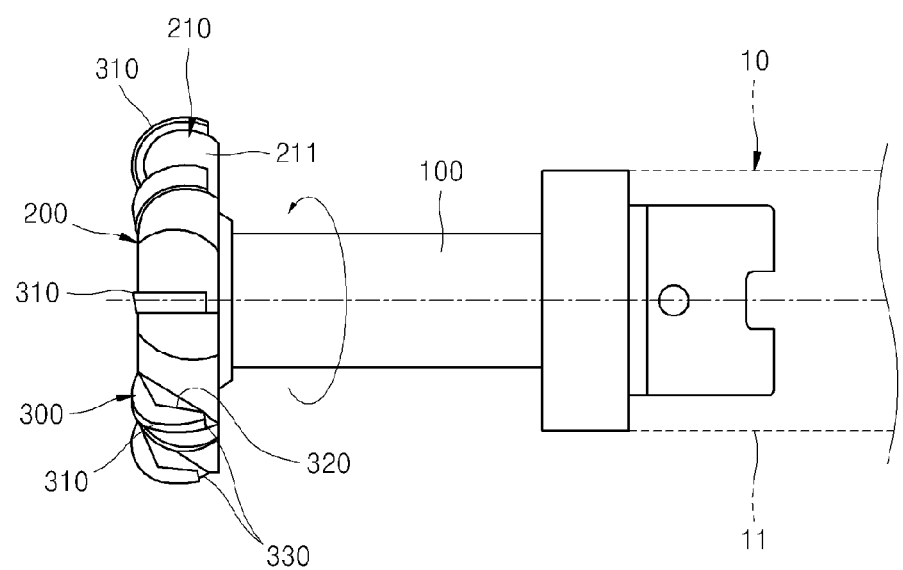
FIG. 2 is a side view showing a PCD milling cutter for lens processing according to the present invention.
Figure 3:
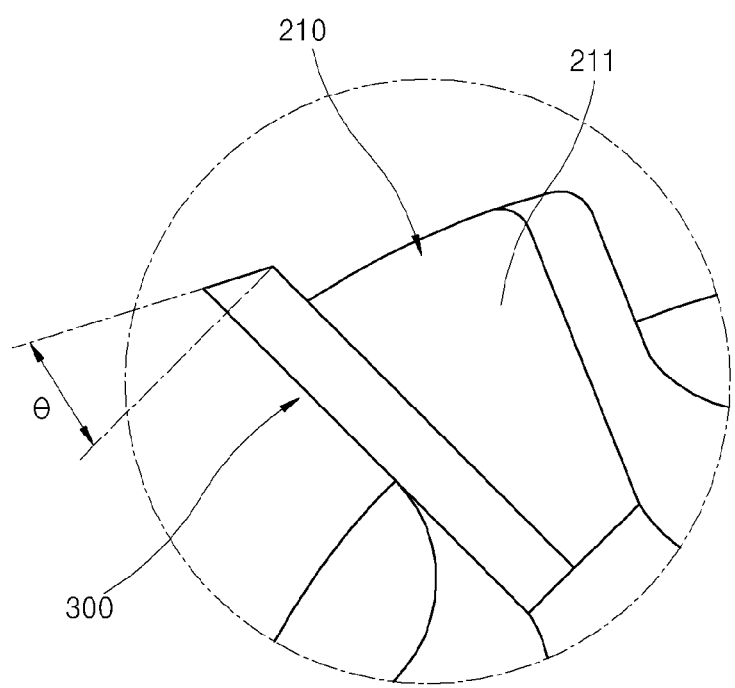
FIG. 3 is an enlarged view showing a main component of the PCD milling cutter for lens processing according to the present invention.

Hereinafter, exemplary embodiments of the present invention will be described in detail with reference to accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying drawings.

In addition, the details of the generally-known technology that makes the subject matter of the present invention unclear will be omitted in the following description.

As shown in FIGS. 1 to 4, a PCD milling cutter for processing a lens according to the present invention includes a shaft 100, a rotary head 200, and a PCD tip 300.

The shaft 100 has a cylindrical shaft. The shaft 100 has one axial end portion which is rotatably fitted around a driving part 11 of a milling unit 10 for processing a lens (not shown).

In this case, the shaft 100 may include a shaft having a circular sectional shape, and an additional coupling part having a coupling hole may be formed at the axial end portion fitted around the driving unit 11.

In addition, the driving unit 11 includes a grip member (not shown) allowing a user to grip the axial end portion of the shaft 100.

In other words, as the driving unit 11 rotates, the shaft 100 normally rotates in a cutting direction, and the rotary head 200 rotates together with the shaft 100.

The rotary head 200 is coupled in such a manner that a rotation center C of the rotary head 200 matches with the center of the axial end portion of the shaft 100.

In addition, the rotary head 200 includes a plurality of installation protrusions 210 protruding along the rim about the rotation center C.

The installation protrusions 210 are arranged at an equal instant along the rim of the rotation head 200.

In this case, the installation protrusions 210 form a circle about the rotation center C of the rotary head 200.

In addition, the outer circumferential surface of each installation protrusion 210 is rounded in an axial direction of the shaft 100.

In other words, the outer circumferential surface of the installation protrusion 210 is curved perpendicularly to a rotational direction of the rotation head 200.

As shown in drawings, 12 installation protrusions 210 may be installed. If necessary, the number of the installation protrusions 210 may be varied.

In addition, the diameter of the rotary head 200 may be varied, and the number of the installation protrusions 210 may be determined according to the diameter of the rotary head 200.

The PCD tip 300 is manufactured in a predetermined shape by processing a poly crystal diamond material (PCD) by a processing machine.

Thereafter, the PCD tip 300 is attached to the installation protrusions 210 of the rotary head 200.

In this case, the PCD tip 300 may be integrally formed with the installation surface positioned in the rotation-direction of the installation protrusion 210 through a welding scheme.

To this end, a welding material (not shown) may be inserted between the installation protrusion 210 and the PCD tip 300.

In addition, a cutting blade 310 of the PCD tip 300 may be rounded in the axial direction of the shaft 100.

In other words, an outer end portion of the cutting blade 310 is rounded perpendicularly to the rotational direction of the rotary head 200 similarly to the outer end portion of the installation protrusion 210.

The cutting blade 310 has a curved outer end portion to accurately process the surface of the lens in the form of a curved surface.

In this case, one rotation-direction end portion of the cutting blade 310 of the PCD tip 300 cuts a portion of the lens to be processed when the rotary head 200 rotates. In this case, the cutting blade 310 may have an inclined angle e in such a manner that the rotation-direction end portion of the rotary head 200 protrudes outward, and the cutting blade 310 may have a semicircular shape (may have sharply processed in a curved shape).

In this case, the rotation-direction end portion of the cutting blade 310 may be positioned at an outermost part from the rotation center C of the rotary head 200.

In other words, since a cutting-direction end portion of the cutting blade 310 protrudes outward, so that an opposite end portion of the cutting blade 310 does not make contact with the surface of the lens . Accordingly, the interference may be minimized.

In particular, a cutting groove 320 is formed in a concave shape in the inner end portion of the PCD tip 300 opposite to the cutting blade 310.

Figure 5:
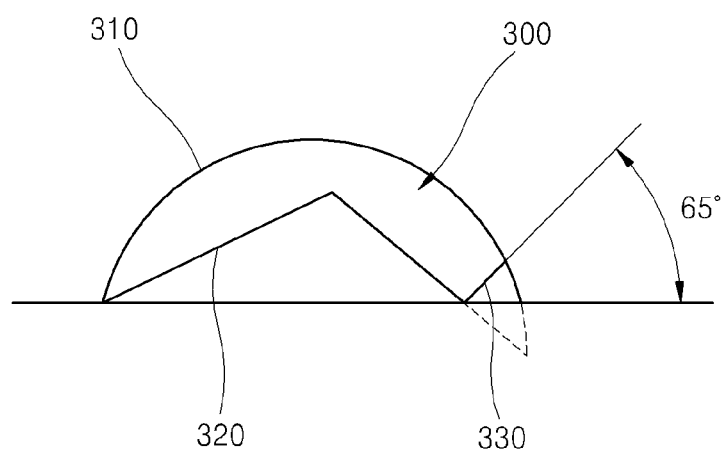
FIG. 5 is a view showing a groove which is cut in a shape of "V" by the PCD tip of the PCD milling cutter for lens processing according to the present invention.
Figure 6:
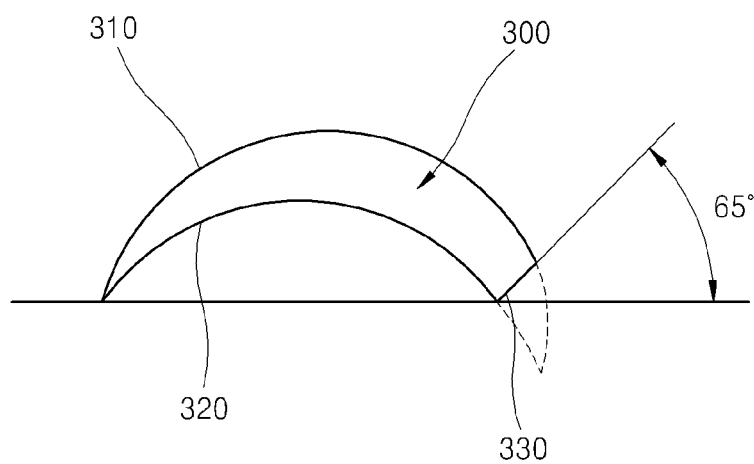
FIG. 6 is a view showing a groove which is cut in a shape of "U" by the PCD tip of the PCD milling cutter for lens processing according to the present invention.

In this case, the cutting groove 320 may have one of an angled V shape shown in FIG. 5 and a curved U shape shown in FIG. 6.

In addition, the PCD tip 300 may further include a cutting step 330 formed by slantingly cutting an end portion directed in the axial-direction of the shaft 100 based on the cutting groove 320.

Since the cutting groove 320 and the cutting step 330 are formed by cutting portions that does not make contact with the surface of the lens, the material of the PCD tip 300 can be reduced.

In addition, according to the PCD tip 300 of the present invention, only the width between an outer part and an inner part is reduced while maintaining the length of the cutting blade 310. Accordingly, the coupling strength between the PCD tip 300 and the installation protrusion 210 is not greatly reduced.

Meanwhile, the PCD tips 300 including materials having different strengths may be selectively arranged. In this case, the PCD tips 300 may be repeatedly arranged in such a manner that the strengths of the PCD tips 300 can be gradually increased.

Figure 4:
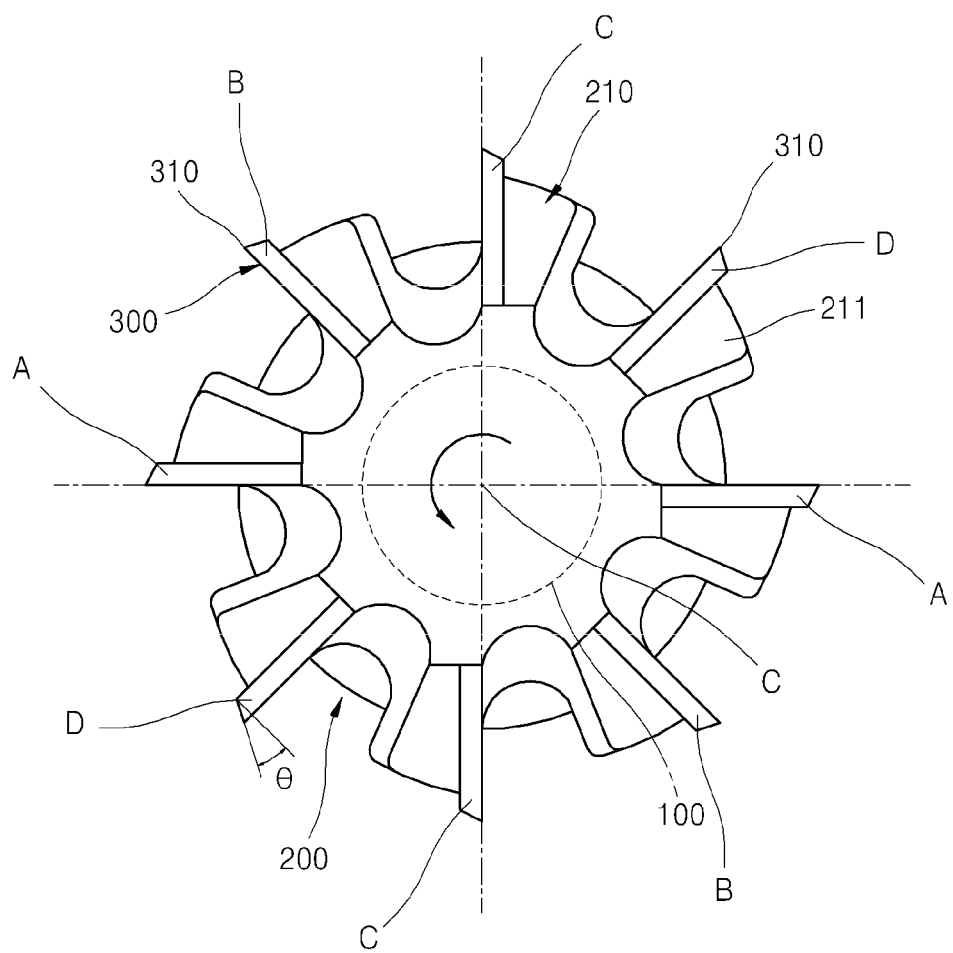
FIG. 4 is a view showing the PCD milling cutter for lens processing including PCD tips having strengths different from each other according to the present invention.

For example, as shown in FIG. 4, the PCD tips 300 may be arranged in the order of A, B, C, and D, in which the PCD tip 300 may include materials representing the strengths increased in the order of A, B, C, and D.

For example, the materials constituting PCD tip (A) 300, the PCD tip (B) 300, the PCD tip (C) 300, and the PCD tip (D) 300, respectively, may have particle sizes in the range of 1 μm to 2 μm, the range of 8 μm to 12 μm the range of 20 μm to 25 μm, and the range of 25 μm to 35 μm, respectively.

However, the strength of the PCD tip 300 is not limited thereto, and may be varied. The arrangement sequence of the PCD tips 300 may be selectively changed if necessary.

As described above, different materials are applied to the PCD tips 300 because the cutting force can be constantly maintained by locally applying the PCD tip 300 having the high strength.

Accordingly, the manufacturing cost can be reduced as compared with a case in which only the PCD tips 300 having the high strength are entirely applied. In addition, the PCD tip 300 can be easily processed, so that the PCD tip 300 can be readily manufactured.

Therefore, according to the present invention, the end portion of the PCD tip 300 opposite to the cutting blade 310 is cut in the concave shape, so that the installation surface of the PCD tip 300 is formed with a narrow width. Accordingly, the material cost can be saved when the PCD tip 300 is manufactured.

In addition, the cutting blade 310 of the PCD tip 300 making contact with a portion of the lens to be processed is inclined while protruding outward, so that the interference between the cutting blade 310 of the PCD tip 300 and the lens can be prevented, thereby improving the cutting performance.

Although the PCD milling cutter for lens processing according to the present invention have been described for illustrative purposes, those skilled in the art will appreciate that various modifications, additions and substitutions are possible, without departing from the scope and spirit of the invention as disclosed in the accompanying claims.

Therefore, the scope of the present invention are not limited to the embodiments, but defined by appended claims, and the equivalent of the claims.

In other words, it should be understood by those skilled in the art that the embodiments are provided only for the illustrative purpose, and the scope of the present invention is represented by following appended claims rather than the detailed description. In addition, it should be understood that all variations or all modifications deduced from the meaning, the scope, and the equivalent concept of the appended claims are included in the scope of the present invention.

What is claimed is:

1. A polycrystalline diamond ,(PCD) milling cutter for lens processing, the PCD milling cutter comprising:
    a shaft having one axial end portion rotatably coupled with a driving unit of a milling unit for lens processing;
    a rotary head coupled with the axial end portion of the shaft and having a plurality of installation protrusions which protrude outward along a circumference of the rotary head about a rotation center and have outer circumferential surfaces rounded in an axial direction of the shaft; and
    a plurality of PCD tips coupled with installation surfaces of the installation protrusions positioned in a rotation direction, provided at outer end portions thereof with rounded cutting blades sharply processed in the axial direction of the shaft, and provided in inner end portions thereof, which are opposite to the cutting blades, with cutting grooves formed in a concave shape to increase a welding strength, each one of the plurality of PCD tips including a cutting step formed by slantingly cutting an end portion directed in the axial direction of the shaft based on the cutting grooves.

2. The PCD milling cutter of claim 1, wherein each cutting blade has an inclination angle such that an end portion of the rotary head positioned in the rotation direction protrudes outward.

3. The PCD milling cutter of claim 1, wherein each cutting blade has a semicircular shape.

4. The PCD milling cutter of claim 1, wherein each cutting groove has one of a curved U shape and an angled V shape.

5. The PCD milling cutter of claim 1, wherein the PCD tips are obtained by varying sizes of particles constituting fine structures and are arranged to have mutually different strengths so that the PCD milling cutter has improved abrasion resistance in a cutting work and improved durability.

6. The PCD milling cutter of claim 5, wherein the PCD tips are repeatedly arranged such that the strengths of the PCD tips are gradually increased.

* * * * *